United States Patent [19]

DuFour

[11] Patent Number: 4,500,679
[45] Date of Patent: Feb. 19, 1985

[54] POLYBLENDS OF THERMOPLASTIC COPOLYETHERESTERS STYRENE-MALEIC ANHYDRIDE POLYMERS, AND ACRYLONITRILE-BUTADIENE-STYRENE POLYMERS

[75] Inventor: Daniel L. DuFour, Longmeadow, Mass.

[73] Assignee: Monsanto Company, St. Louis, Mo.

[21] Appl. No.: 406,407

[22] Filed: Aug. 9, 1982

[51] Int. Cl.³ .................... C08L 67/02; C08L 51/04; C08L 55/02
[52] U.S. Cl. .................................. 525/64; 525/173; 525/175; 525/176
[58] Field of Search ............... 525/64, 166, 175, 176, 525/173

[56] References Cited

U.S. PATENT DOCUMENTS

| | | | |
|---|---|---|---|
| 3,718,715 | 2/1973 | Crawford | 260/873 |
| 3,963,801 | 6/1976 | Su | 260/873 |
| 4,110,411 | 8/1978 | Imanaka | 525/92 |
| 4,124,653 | 11/1978 | Whitlock | 260/873 |
| 4,126,602 | 11/1978 | Salee | 524/513 |
| 4,234,701 | 11/1980 | Abolins | 525/68 |
| 4,337,192 | 6/1982 | Campbell | 523/212 |
| 4,346,195 | 8/1982 | Hornbaker | 525/64 |

FOREIGN PATENT DOCUMENTS

| | | | |
|---|---|---|---|
| 55-21430 | 2/1980 | Japan | 525/64 |
| 55-50058 | 4/1980 | Japan | 525/64 |
| 2074587 | 11/1981 | United Kingdom | 525/64 |

OTHER PUBLICATIONS

Chem. Abs. 88: 171028m 1978.

Primary Examiner—Melvyn I. Marquis
Assistant Examiner—Patricia Short
Attorney, Agent, or Firm—Linda L. Lewis; William J. Farrington; Paul D. Matukaitis

[57] ABSTRACT

Molding compositions are prepared from blends of (A) a thermoplastic copolyetherester elastomer; (B) a styrene maleic anhydride polymer; and (C) an ABS or MBS polymer. Component B, the styrene maleic anhydride polymer may optionally contain a termonomer such as methylmethacrylate or acrylonitrile and a rubber component.

15 Claims, No Drawings

POLYBLENDS OF THERMOPLASTIC COPOLYETHERESTERS STYRENE-MALEIC ANHYDRIDE POLYMERS, AND ACRYLONITRILE-BUTADIENE-STYRENE POLYMERS

BACKGROUND OF THE INVENTION

This invention relates to polyblends and specifically to polyblends of styrene-maleic anhydride (SMA) polymers and acrylonitrile-butadiene-styrene (ABS) polymers with certain thermoplastic copolyetheresters capable of conferring on the SMA polymers and blends thereof with ABS improved impact properties.

SMA polymers of the type described herein and blends of the SMA polymers with ABS polymers are useful as molding and extrusion compounds. Certain end-use applications require impact strengths above those obtained with SMA polymers and blends thereof with ABS. Examples of such applications include the dashboard and instrument panels in automobiles, appliance housings and smaller molded parts for various uses. Other properties of the molded objects, such as Vicat softening temperature and tensile strength, should be maintained within useful ranges.

The present invention provides a means of improving the impact properties of SMA polymers and blends thereof with ABS while maintaining other physical properties within useful ranges.

DESCRIPTION OF THE PRIOR ART

Polyblends of SMA and ABS type polymers are described in U.S. Pat. Nos. 4,197,376 and 4,305,869. Polyblends of SMA, ABS and PVC are described in U.S. Pat. Nos. 4,311,806 and 4,329,272. Blends of SMA type polymers and aromatic polyesters are described in U.S. Pat. No. 4,126,602. Copolyetherester elastomers are described in U.S. Pat. Nos. 3,023,192, 3,651,014, 3,766,146, 3,775,373, 3,784,520 and 3,891,604.

SUMMARY OF THE INVENTION

The present invention provides a polyblend comprising:

A. from 3 to 90% by weight of a thermoplastic copolyetherester elastomer;

B. from 5 to 70% by weight of a polymer of a vinylaromatic monomer (e.g. styrene) and an unsaturated dicarboxylic acid anhydride monomer (e.g. maleic anhydride) and optionally a termonomer, preferably one selected from the group consisting of $C_1$ to $C_3$ acrylates and methacrylates and unsaturated nitriles, wherein the relative amounts by weight of the monomers in the polymer are 50 to 85% of the vinylaromatic monomer, 15 to 35% of the dicarboxylic acid anhydride and 0 to 20% of the termonomer; and wherein the monomers are polymerized in the presence of 0 to 25% by weight of a rubber having a glass transition temperature below 0° C.; and C. from 5 to 70% by weight of a grafted composition comprising a graft polymer of from 20 to 40 parts by weight of a monomer selected from the group consisting of methyl methacrylate and acrylonitrile and 80 to 60 parts by weight of a vinyl aromatic monomer the polymer being grafted onto a substrate rubber having a glass transition temperature below 0° C. wherein the monomers are polymerized in the presence of and grafted onto the substrate rubber, wherein the weight percent of the rubber is in the range from 5 to 60% by weight based on the weight of the composition;

and wherein the weight percent for Components A, B and C is based on the total amount of Components (A), (B) and (C) in the polyblend.

Thermoplastic copolyetherester elastomers which are suitable for use as Component A in the practice of the present invention are defined below. The term "thermoplastic copolyetherester elastomer" as used herein means a segmented polymer comprising about 30% to about 80% by weight of recurring linear etherester (soft) segments derived from difunctional polyether glycol and dicarboxylic acid and about 70% to about 20% by weight of recurring linear ester (hard) segments derived from organic diol and aromatic dicarboxylic acid. Polyether glycols having a number average molecular weight from about 350 to about 6000 are suitable with polyether glycols having a molecular weight between about 800 and 4000 being preferred. The aromatic ester hard segment represents a repeating unit of a fiber-forming polyester having a melting point above 150° C., preferably, above 200° in its fiber-forming molecular weight range, for example, polyethyleneterephthalate and polytetramethyleneterephthalate. For further details on the preparation, composition and properties of such segmented thermoplastic copolyetherester elastomers, see U.S. Pat. Nos. 3,023,192; 3,651,014; 3,766,146; 3,775,373; 3,784,520 and 3,891,604, all assigned to E. I. duPont de Nemours and Company, the disclosures of which are hereby incorporated by reference. Suitable segmented thermoplastic copolyetherester elastomers derived from terephthalic acid, polytetramethylene ether glycol and 1,4-butanediol may be purchased from du Pont under the trademark HYTREL® elastomer.

Further information on HYTREL® elastomers is contained in *New Commercial Polymers, 1969–1975,* by Hans-Georg Elias, Midland Macromolecular Institute, Midland, Mich. 48640, translated from the German by Mary M. Exner; Gordon and Breach Science Publishers (New York, London and Paris) at Pages 85 to 89, and in "Polymerization Reaction & New Polymers, "Segmented Polyester Thermoplastic Elastomers" by W. K. Witsiepe, published in *Polymerization Reactions & New Polymers,* at pages 39 to 59, Amer. Chem. Soc.—Advances in Chemistry Series No. 129 (edited by N. J. Platzer) 1973, the disclosures of which are hereby incorporated herein by reference.

Component B of the above formulation is preferably a styrene/maleic anhydride polymer. The styrene may be replaced in whole or in part by other vinylaromatic monomers such as alpha-methyl styrene, chlorostyrene, bromostyrene, p-methyl styrene and vinyl toluene. Similarly the maleic anhydride can be replaced in whole or in part by another unsaturated dicarboxylic anhydride such as itaconic, aconitic or citraconic anhydride. Component B optionally contains a termonomer such as $C_1$ to $C_3$ alkyl acrylate or methacrylate, acrylonitrile or methacrylonitrile. The preferred termonomer, where present, is methyl methacrylate.

The proportions of the monomers preferably employed provide an anhydride content of from 15 to 30% by weight and a methyl methacrylate content of 5 to 15% by weight with the balance being styrene.

Component C is typically an ABS or MBS type polymer that is to say a diene rubber substrate grafted with styrene and either acrylonitrile, methyl methacrylate, methyl acrylate or a mixture of these monomers. However the rubber need not be the conventional polybutadiene or butadiene/styrene copolymer since any rubber with a glass transition temperature below 0° C., can be used. Such rubbers include those which may provide the substrate for rubber modified SMA polymers described below. The styrene may be replaced in whole or in part by other styrenic monomer such as described with reference to Component B above. The acrylonitrile may be replaced in whole or in party by methacrylonitrile.

Component C may be replaced in whole or in part by a rubber modified styrene-maleic anhydride polymer. Rubber modified SMA polymers are prepared by polymerizing monomers of the type and amounts used to prepare Component B above, e.g., styrene, maleic anhydride and optionally methyl methacrylate, in the presence of the rubber in such a way that the polymerizing monomers are grafted onto the rubber substrate and a matrix copolymer of essentially the same composition as the graft copolymer is simultaneously generated. Suitable methods of producing such rubber modified copolymers are well known in the art and a typical process is described in U.S. Pat. No. 3,919,354.

The rubber modified SMA polymer contains from 5 to 35% by weight of a rubber component and preferably from 10 to 25 percent by weight of such a rubber component. The rubber component is conventionally a diene rubber such as polybutadiene, polymers of butadiene with a comonomer such as styrene or acrylonitrile which contain at least 60% and preferably 80% by weight of butadiene or a butadiene based block or radial-block rubber. Other rubbers such as EPDM rubber, polypentenamer, polyisoprene, polychloroprene, polyacrylate rubbers and the like can, if desired, also be used.

In addition to the above components the polyblends of the invention can advantageously contain other additives such as plasticizers, antioxidants, stabilizers, flame-retardants, fibers, mineral fibers, dyes, pigments and the like.

The components of the polyblend can be blended together by any convenient process. Usually however they are extrusion blended or compounded in a high intensity blender such as a Banbury Mixer. When using greater than about 30% by weight of Component A the use of extrusion blending is preferred.

Components B and C can be together provided by the formulations described in U.S. Pat. Nos. 4,305,869 and 4,197,376 and then blended with Component A.

The invention is now described with reference to the following examples which are for the purposes of illustration only and are not intended to imply any limitation on the scope of the invention. The components described below are blended in a number of different ratios and tested for various properties.

COMPONENTS USED

ABS-1—prepared by the graft emulsion polymerization of styrene and acrylonitrile in a weight ratio of 70:30 in the presence of polybutadiene. ABS-1 contains 40% by weight of polybutadiene. The weight average molecular weight of the free styrene/acrylonitrile matrix polymer associated with the styrene/acrylonitrile graft polymer is in the range from 200,000 to 400,000 as determined by gel permeation chromatography [GPC] using ASTM Method D 3536-76 modified in that 4 columns in series using micro Styragel (Waters Assoc.) packing are used with a nominal exclusion limit of 500A units, 1,000A units, 10,000A units and 100,000A units. The detector is a ultra violet light detector set at wavelength 254 nm. The test samples are prepared at a concentration of 0.25% weight of polymer in tetrahydrofuran. The sample injection size is 0.2 ml and a flow rate of 2 ml/min. at ambient temperature is used.

The grafted polybutadiene has an average particle size in the range of from 0.1 to 0.25 micron measured as a weight average particle size diameter with centrifugal photosedimentometer (CPSM) by the published procedure of Graves, M. J. et al "*Size Analysis of Subsieve Powders Using a Centrifugal Photosedimentometer*", British Chemical Engineering 9:742–744 (1964). A Model 3000 Particle Size Analyzer from Martin Sweets Co., 3131 W. Market St., Louisville, KY is used.

ABS-2—prepared by the graft suspension polymerization of styrene and acrylonitrile in a weight ratio of 78:28 in the presence of polybutadiene. ABS-2 contains 14% by weight of polybutadiene. The weight average molecular weight by GPC of the free styrene/acrylonitrile matrix polymer associated with the styrene/acrylonitrile graft polymer is in the range from 70,000 to 100,000 and the grafted polybutadiene has an average particle size in the range of from 0.6 to 1.6 microns by CPSM.

ABS-3—is the same as ABS-2 except that the weight average molecular weight by GPC of the free styrene/acrylonitrile matrix polymer associated with the grafted styrene/acrylonitrile polymer is from 100,000 to 150,000 and the grafted polybutadiene has an average particle size in the range of 1.8 to 3.5 by CPSM.

S/MA/MM—a terpolymer prepared by polymerizing a monomer mixture of styrene, maleic anhydride and methyl methacrylate to produce a composition in which the above monomers are in the weight ratio of 72:22:6 respectively.

SAN—prepared by polymerizing a monomer mixture of styrene and acrylonitrile to produce a SAN polymer having a weight ratio of 76:24.

TCPE-1—a thermoplastic copolyetherester elastomer which is a block copolymer of short-chain diol terephthalate and long-chain polyether diol terephthalate available from DuPont Company, Elastomer Chemicals Department, Wilmington, DE 19898 under the designation HYTREL ® 5556. This material, which comprises about 60% by weight of hard segments of polybutylene terephthalate and about 40% by weight of soft segments of polytetramethylene ether terephthalate, has a Durometer hardness (ASTM D-2240) of 55D, a melting point (ASTM D-2117) of 211° C.; a Vicat Softening Point (ASTM D1525) of 180° C. and flexural modulus (ASTM D790) of 207 megapascals (MPa).

TCPE-2—a thermoplastic copolyetherester elastomer which is a block copolymer of short-chain diol terephthalate and long-chain polyether diol terephthalate available from DuPont Company, Elastomer Chemicals Department, Wilmington, DE 19898 under the designation HYTREL ® 4056. TCPE-2 is softer and has a lower flexural modulus than TCPE-1. HYTREL ® 4056, which comprises about 42% by weight of hard segments of polybutylene terephthalate and about 58% by weight of soft segments of polytetramethylene ether terephthalate, has a Durometer hardness of 92A/40D; a melting point of 168° C.; a Vicat Softening Point of 112° C. and flexural modulus of 48.3 MPa.

TCPE-3—a thermoplastic copolyetherester elastomer which is a block copolymer of short-chain diol terephthalate and long-chain polyether diol terephthalate available from DuPont Company, Elastomer Chemicals Department, Wilmington, DE 19898 under the designation HYTREL® 7246. This material, which comprises about 80% by weight of hard segments of polybutylene terephthalate and about 20% by weight of soft segments of polytetramethylene ether terephthalate, has a Durometer hardness of about 72D; a melting point of 219° C.; a Vicat Softening Point of 207° C. and a flexural modulus of 585 MPa.

Glycolube TS—a glycerol tristearate plasticizer, available from Glyco.

Goodrite 3114—an alkylated phenol antioxidant available from Goodrich.

Ethanox 330—an alkylated phenol antioxidant available from Ethyl Corporation.

SAMPLE PREPARATION AND TEST METHODS

The components used in the working examples containing up to 30% Hytrel are compounded in a Banbury at 180° to 250° C. The components used in the working examples containing 30% or more Hytrel are compounded in a Killion extruder at 200° to 250° C. The resulting blends are injection molded on an Arburg Molding Machine at 220° to 260° C. and 500 to 2000 psi. The molded samples are subjected to the following tests:

VICAT Softening Point (ASTM-D-1525-76-Rate B) a one (1) kg test using a heating rate of 120° C. per hour;

Izod Impact (ASTM D-256-56) with results given in Joules/meter J/m; and

Gardner Impact using a 2.54 mm thick sample, a 6.35 mm diameter dart and a 14.3 mm diameter ring with results given in Joules (J).

Viscosity—(ASTM-D-3835) using a temperature of 246° C. and a shear rate of 100 reciprocal seconds. The results are given in pascal seconds (Pa.s) multiplied by $10^{-2}$.

Tensile (ASTM-D-638) results given in megapascals (MPa.).

Modulus (ASTM-D-638) results given in megapascals (MPa.).

WORKING EXAMPLES AND TEST RESULTS

In Examples 1 to 26 various polyblends are prepared and tested and the results tabulated in Tables 1 to 5. Control Examples are identified as C-1 to C-12 are included in Tables 1 to 5 for comparison purposes. All examples are prepared using 0.3% by weight of either Ethanox 330 or Goodrite 3114 and Glycolube TS (2.5%) based on total weight of polymeric components (A), (B) and (C). The examples in Tables 1 and 2 use Ethanox; the others use Goodrite. The amounts of the polymeric components (A), (B) and (c) used are parts by weight and, except for minor deviations in certain examples, are calculated to add up to a 100 parts by weight total.

TABLE 1
POLYBLENDS USING HYTREL 5556

| COMPONENTS | C-1 | 1 | 2 | 3 | 4 | 5 | 6 | 7 |
|---|---|---|---|---|---|---|---|---|
| HYTREL 5556 | — | 3.0 | 7.5 | 15 | 30 | 50 | 70 | 85 |
| S/MA/MM | 50 | 48.5 | 46.25 | 42.5 | 35 | 25 | 15 | 7.5 |
| ABS-1 | 33 | 32 | 30.53 | 28 | 23.1 | 17.5 | 9.9 | 4.5 |
| ABS-3 | 17 | 16.5 | 15.72 | 14.5 | 11.9 | 8.5 | 5.1 | 2.5 |
| GARDNER J | 9.3 | 9.1 | 15.4 | 15.0 | 11.5 | 11.9 | 10.2 | 9.5 |
| IZOD J/m NOTCH | 150 | 169 | 181 | 211 | 146 | 141 | — | — |
| VISCOSITY | 14.1 | 13.5 | 12.5 | 11.1 | — | — | — | — |
| VICAT °C. | 133 | 133 | 133 | 135 | 135 | 140 | 150 | 156 |
| TENSILE YIELD MPa | 33 | 32.7 | 33.7 | 34.1 | 28.1 | 18 | — | — |
| TENSILE FAIL MPA | 30.9 | 30.7 | 31 | 31.3 | 26.5 | 22.8 | — | — |
| % ELONGATION YIELD | 2.0 | 2.1 | 2.2 | 2.0 | 3.6 | 4.5 | — | — |
| % ELONGATION FAIL | 24.3 | 30.5 | 18.8 | 29.8 | 42 | 126 | — | — |
| MODULUS MPa | 2170 | 1780 | 1810 | 2034 | 1520 | 731 | — | — |

EXAMPLES 1 TO 7

Examples 1 to 7, which are tabulated in TABLE 1, illustrate the improved Izod impact obtained in an SMA/ABS polyblend when using from 3 to 85% by weight of a segmented copolyetherester elastomer (HYTREL 5556) in combination with from 7.5 to 48.5% by weight of an SMA polymer and from 7 to 48.5% by weight of an ABS polymer.

The Gardner impact values also increase over the control (C-1) with increasing amounts of the copolyetherester up to about 70% by weight (Example 6) with no substantial difference being observed at 85% by weight (Example 7). The Vicat softening point increases significantly over the control (C-1) when using about 50% weight or more of the copolyetherester.

TABLE 2
POLYBLENDS USING HYTREL 4056

| COMPONENTS | C-1 | 8 | 9 | 10 | 11* | 12* | 13 | 14 | 15 |
|---|---|---|---|---|---|---|---|---|---|
| HYTREL 4056 | — | 3.0 | 7.5 | 15 | 30 | 30 | 50 | 70 | 85 |
| S/MA/MM | 50 | 48.5 | 46.25 | 42.5 | 35 | 35 | 25 | 15 | 7.5 |
| ABS-1 | 33 | 32 | 30.53 | 28 | 23.1 | 23.1 | 17.5 | 9.9 | 4.5 |
| ABS-3 | 17 | 16.5 | 15.72 | 14.5 | 11.9 | 11.9 | 8.5 | 5.1 | 2.5 |
| GARDNER J | 9.3 | 8.8 | 14.8 | 15.7 | 13.1 | 12.3 | 9.0 | 7.9 | 6.8 |
| IZOD J/m | 150 | 172 | 197 | 220 | 266 | 239 | 304 | no | no |

TABLE 2-continued

POLYBLENDS USING HYTREL 4056

| COMPONENTS | C-1 | EXAMPLES 8 | 9 | 10 | 11* | 12* | 13 | 14 | 15 |
|---|---|---|---|---|---|---|---|---|---|
| NOTCH | | | | | | | | break | break |
| VISCOSITY | 14.1 | 13.9 | 12.4 | 11.2 | 8.8 | — | — | — | 2.6 |
| VICAT °C. | 133 | 133 | 133 | 133 | 132 | 129 | 126 | 118 | 112 |
| TENSILE YIELD MPa | 33 | 32 | 31.7 | 31.3 | — | 23.3 | 10.8 | 6.2 | — |
| FAIL MPa | 30.9 | 30 | 29.6 | 28.2 | — | 23.6 | 19.3 | 18.6 | — |
| % ELONGATION YIELD | 2.0 | 2.3 | 2.4 | 2.4 | — | 3.9 | 4.2 | 5.8 | — |
| % ELONGATION FAIL | 24.3 | 27.0 | 22.3 | 37.6 | — | 79 | 270 | 738 | — |
| MODULUS MPa | 2170 | 1910 | 1700 | 1660 | — | 1248 | 490 | — | — |

*Example 11 was blended in a Banbury mixer, and
*Example 12 was blended in a Killion extruder.

EXAMPLES 8 TO 15

Examples 8 to 15, which are tabulated in Table 2, illustrate the improved Izod impact obtained in an SMA/ABS polyblend when using 3 to 85% by weight of a segmented copolyetherester elastomer (HYTREL 4056) in combination with from 7.5 to 48.5% by weight of an SMA polymer and from 7 to 48.5% by weight of an ABS polymer. In this system the Gardner impact values increase over the control (C-1) with increasing amount of the copolyetherester until about 50% by weight of the polyetherester before falling off to values lower than the Control (C-1). The Vicat softening temperature begins to decrease significantly when using about 50% or more of the polyetherester to a Vicat of 112° C. at the 85% by weight level.

TABLE 3

POLYBLENDS USING HYTREL 7246

| COMPONENTS (2) | C-1 | C-2 | EXAMPLES 16 | 17 | 18 |
|---|---|---|---|---|---|
| HYTREL 7246 | — | 100 | 30 | 50 | 70 |
| S/MA/MM | 50 | — | 35 | 25 | 15 |
| ABS-1 | 33 | — | 23.1 | 17.5 | 9.9 |
| ABS-3 | 17 | — | 11.9 | 8.5 | 5.1 |
| GARDNER J | 9.3 | 20.6 | 15.3 | 17.5 | 20.3 |
| IZOD J/m NOTCH | 150 | 136 | 65 | 49 | 49 |
| VISCOSITY | 14.1 | — | — | — | — |
| VICAT °C. | 133 | over 190 | 135 | 157 | 187 |
| TENSILE YIELD MPa | 33 | — | 32.3 | 28.1 | — |
| FAIL MPa | 30.9 | — | 29.1 | 28.3 | — |
| % ELONGATION YIELD | 2.0 | — | 3.35 | 6.54 | — |
| % ELONGATION FAIL | 24.3 | — | 54 | 188 | — |
| MODULUS MPa | 2160 | — | 1520 | 1160 | — |

EXAMPLES 16 TO 18

In this series of examples, which are tabulated in TABLE 3, polyblends containing from 3 to 70% by weight of a thermoplastic copolyetherester (HYTREL 7246®), from 15 to 35% by weight of an SMA polymer and 15 to 35% of an ABS polymer are compared to a polyblend of SMA and ABS polymers (C-1) and unmodified copolyetherester (C-2). In this series the Gardner impact increases over Control C-1 with increasing amounts of the copolyetherester whereas the Izod impact decreases compared to Control (C-1). Once again the Vicat temperature does not change significantly over C-1 until the copolyetherester level reaches 50% by weight. In certain end use applications wherein the molded or extruded part is in the form of large sheet, e.g. instrument panels, panels on recreational vehicles, refrigerator panels, the higher Gardner impact values would be more of a consideration than the Izod values when selecting a molding or extrusion composition. On the other hand, when considering smaller parts, e.g. rear view mirror housings, hub caps, automobile grilles, cassettes, and appliance housings, etc. the Izod values may be more of a consideration than the Gardner values.

EXAMPLES 19 TO 22

The polymer components used in Examples 19 to 22, which are tabulated in TABLE 4, are similar to Examples 8 to 15 except that ABS-2 is used in place of the ABS-3 used in Examples 8 to 15. Also included are Control Examples C-3 to C-7. When comparing Examples 19 and 20 to Control C-3 and Examples 21 and 22 to Control C-4 it is noted that both Izod and Gardner impacts increase when using 7.5 and 15% of the copolyetherester (Component A) while the heat temperature remains the same. A comparison of Examples 21 and 22 with Control C-4 also shows that both impact values increase while the Vicat temperature remains the same. Note also that when the SMA polymer (Component B) is omitted (Controls C-5 to C-7) the Vicat softening point is lowered significantly even when replacing the SMA component by an SAN component.

EXAMPLES 23 TO 26

The polymer components used in Examples 23 to 26, which are tabulated in TABLE 5, are similar to those used in Examples 16 to 18 except that ABS-2 is used in place of the ABS-3 used in Examples 16 to 18. A comparison of Example 23 with Control C-8 illustrates that the presence of 7.5% by weight of the polyetherester (Component A) in the particular control composition of C-8 has no appreciable effect on Gardner or Izod impact. A comparison of Controls C-8, C-9 and C-12 shows the influence of the SMA polymer component on the impact strength of SMA/ABS blends. A comparison of Examples 24 and 25 with Control C-9 shows that 7.5% and 15% of the polyetherester has a significant effect on Gardner and Izod impact. Thus the desired degree of improvement in immpact strength can be obtained by a proper selection of the amount of each component in the blend. Controls C-10 and C-11 show the effect of the SMA polymer (Component B) on the Vicat softening point. Without the SMA the Vicat temperature drops to that of the ABS component even when the copolyester is present (C-11). A Vicat softening point of at least 110° C. is preferred in the polyblends of the present invention.

amounts such that the weight ratio of the SMA polymer to the ABS polymer is in the range of from 20:80 to 80:20, with 30:70 to 70:30 being especially preferred when using 3 to 20% by weight of the polyetherester component.

Especially good impact values can be expected when

TABLE 4

POLYBLENDS BASED ON HYTREL 4056 AND ABS-2

| COMPONENTS | C-3 | 19 | 20 | C-4 | 21 | 22 | C-5 | C-6 | C-7 |
|---|---|---|---|---|---|---|---|---|---|
| HYTREL 4056 | — | 7.5 | 15 | — | 7.5 | 15 | — | 7.5 | 15 |
| S/MA/MM | 32 | 29.5 | 27 | 63 | 58.3 | 53.6 | — | — | — |
| ABS-1 | 45 | 41.5 | 38 | 24 | 22.2 | 20.4 | 45 | 41.5 | 38 |
| ABS-2 | 23 | 21.5 | 20 | 13 | 12.0 | 11 | 23 | 21.5 | 20 |
| SAN | — | — | — | — | — | — | 32 | 29.5 | 27 |
| GARDNER J | 16.3 | 17 | 17.6 | 0.9 | 6.8 | 9 | 16.6 | 16.6 | 15.9 |
| IZOD J/m NOTCH | 266 | 331 | 352 | 98 | 146 | 174 | — | — | — |
| VISCOSITY | 12.6 | — | 10 | — | — | — | — | — | — |
| VICAT °C. | 122 | 122 | 122 | 135 | 135 | 135 | 104 | 104 | 105 |
| TENSILE | | | | | | | | | |
| YIELD MPa | 30.8 | 29.6 | 28.6 | 36.5 | 36.6 | 35.4 | — | — | — |
| FAIL MPa | 26.8 | 26.1 | 25.1 | 32.2 | 30.9 | 29.9 | — | — | — |
| % ELONGATION YIELD | 1.95 | 2.2 | 2.6 | 2.2 | 2.2 | 2.2 | — | — | — |
| FAIL | 39 | 28 | 53 | 23 | 18.5 | 37 | — | — | — |
| MODULUS MPa | 1950 | 1750 | 1580 | 2520 | 2210 | 2210 | — | — | — |

TABLE 5

POLYBLENDS USING HYTREL 7246 AND ABS-2

| COMPONENTS (2) | C-8 | 23 | C-9 | 24 | 25 | C-10 | C-11 | C-12 | 26 |
|---|---|---|---|---|---|---|---|---|---|
| HYTREL 7246 | — | 7.5 | — | 7.5 | 15 | — | 15 | — | 7.5 |
| S/MA/MM | 32 | 29.5 | 50 | 46.25 | 42.5 | — | — | 63 | 58.3 |
| ABS-1 | 45 | 41.5 | 33 | 30.53 | 28 | 33 | 28 | 24 | 22.2 |
| ABS-2 | 23 | 21.5 | 17 | 15.73 | 14.5 | 17 | 14.5 | 13 | 12 |
| SAN | — | — | — | — | — | 50 | 42.5 | — | — |
| GARDNER J | 16.3 | 17 | 5.4 | 15.8 | 16 | 20.3 | 21 | 0.9 | 1.1 |
| IZOD J/m NOTCH | 266 | 266 | 152 | 190 | 211 | — | — | 98 | 98 |
| VISCOSITY | 12.6 | — | — | — | — | — | — | — | — |
| VICAT °C. | 122 | 122 | 131 | 130 | 131 | 105 | 105 | 135 | 136 |
| TENSILE | | | | | | | | | |
| YIELD MPa | 30.8 | 27.9 | 32 | 32.3 | 33.4 | — | — | 36.5 | 36.3 |
| FAIL MPa | 26.8 | 21.1 | 29.6 | 30.5 | 30.6 | — | — | 32.2 | 33 |
| % ELONGATION YIELD | 1.85 | 2.2 | 2.0 | 2.20 | 2.5 | — | — | 2.2 | 2.1 |
| % ELONGATION FAIL | 39 | 47 | 27 | 43 | 42 | — | — | 23 | 25 |
| MODULUS MPa | 1950 | 1700 | 2170 | 2100 | 1940 | — | — | 2520 | 2420 |

The amounts of the various polymeric components used in the present invention can be varied within wide limits in order to obtain the desired properties in the final molded or extruded product. In this regard the amount of the polyetherester component will be in the range of from 3 to 90% by weight. Amounts of polyetherester in the range of from 3 to 30% by weight, are preferred for some applications where no change in Vicat temperature (over that of the SMA/ABS components) is preferred. In other applications where an increase in both Gardner and Izod impacts is sought, the preferred amounts of the polyether will be in the range of 3 to 20% by weight.

The amount of the SMA polymer component used is in the range of from 5 to 70% by weight and the amount of the ABS component used is in the range of from 5 to 70% by weight. As seen in the working examples, the amount of the SMA and ABS polymer components used will depend on the properties sought in the final product. For a balance of higher impact values and higher Vicat temperatures it is preferred to select the SMA polymer component is a rubber modified SMA polymer as described above, which contains from 5 to 35%, preferably 5 to 25%, by weight of rubber component. Such rubber modified SMA polymers when used in combination with the ABS polymer can provide a high rubber content to the blend. Optionally, the rubber modified SMA can replace part or all of the ABS component.

What is claimed is:

1. A polyblend consisting essentially of:
   A. from 3 to 90% by weight of a thermoplastic copolyetherester elastomer;
   B. from 5 to 70% by weight of a polymer of a vinylaromatic monomer and an unsaturated dicarboxylic acid anhydride monomer and optionally a termonomer, selected from the group consisting of $C_1$ to $C_3$ acrylates and methacrylates and unsaturated nitriles, wherein the relative amounts by weight of the monomers in the polymer are 50 to 85% of the vinylaromatic monomer, 15 to 35% of the dicarboxylic acid anhydride and 0 to 20% of the termonomer; and wherein the monomers are polymerized in the presence of 0 to 25% by weight of a rubber having a glass transition temperature below 0° C.; and C. from 5 to 70% by weight of a grafted polymer composition comprising a graft polymer of from 20 to 40 parts by weight of a monomer selected from the group consisting of methyl methacrylate and acrylonitrile and 80 to 60 parts by weight of a vinyl aromatic monomer, the polymer being grafted onto a substrate rubber having a glass transition temperature below 0° C. wherein the monomers are polymerized in the presence of and grafted onto the substrate rubber, wherein the weight percent of the rubber is in the range from 5 to 60% by weight based on the weight of the composition;

and wherein the weight percent for Components (A), (B) and (C) is based on the total amount of Components (A), (B) and (C) in the polyblend.

2. A polyblend as in claim 1 wherein the copolyetherester is in the range from 3 to 30% by weight and the weight ratio of the polymer of vinyl aromatic monomer and dicarboxylic acid monomer to the grafted polymer composition is in the range from 20:80 to 80:20.

3. A polyblend as in claim 1 wherein the copolyetherester is in the range from 3 to 20% by weight and the weight ratio of the polymer of vinyl aromatic monomer and dicarboxylic acid monomer to the grafted polymer composition is in the range from 20:80 to 80:20.

4. A polyblend as in claim 1 wherein the copolyetherester is in the range from 3 to 20% by weight and the weight ratio of the polymer of vinyl aromatic monomer and dicarboxylic acid monomer to the grafted polymer composition is in the range from 30:70 to 70:30.

5. A polyblend as in claim 1 wherein the polyetherester comprises a polytetramethylene ether terephthalate soft segment and a polybutylene terephthalate hard segment.

6. A polyblend as in claim 1 wherein Component B is a styrene maleic anhydride polymer.

7. A polyblend as in claim 1 wherein the grafted polymer of Component C is a butadiene rubber substrate grafted with styrene and acrylonitrile monomers.

8. A polyblend consisting essentially of:
A. from 3 to 30% by weight of a thermoplastic copolyetherester elastomer comprising a polytetramethylene ether terephthalate soft segment and a polybutylene terephthalate hard segment;
B. from 5 to 70% by weight of a styrene maleic anhydride polymer comprising 50 to 85% by weight of styrene, 15 to 35% by weight of maleic anhydride and 0 to 20% of a methyl methacrylate termonomer.
C. from 5 to 70% by weight of a grafted polymer composition comprising a graft polymer of from 20 to 40 parts by weight of acrylonitrile or methyl methacrylate and 80 to 60 parts by weight of styrene, the polymer being grafted onto a butadiene rubber having a glass transition temperature below 0° C. wherein the monomers are polymerized in the presence of and grafted onto the substrate rubber, wherein the weight percent of the rubber is in the range from 5 to 60% by weight based on the weight of the composition;
and wherein the weight ratio of the styrene maleic anhydride polymer to the grafted polymer composition is in the range of 80:20 to 20:80; and wherein the weight percent for Components (A), (B) and (C) is based on the total amount of Components (A), (B) and (C) in the polyblend.

9. A polyblend as in claim 8 wherein the copolyetherester is in the range from 3 to 20% by weight and the weight ratio of the polymer of styrene maleic anhydride polymer to the grafted polymer composition is in the range from 30:70 to 70:30.

10. A polyblend as in claim 8 wherein the styrene maleic anhydride polymer contains 5 to 15% by weight of a methyl methacrylate termonomer and wherein the grafted polymer of Component C is a butadiene rubber substrate grafted with styrene and acrylonitrile monomers.

11. A polyblend according to any one of claims 1 to 10 consisting essentially of:
(A) a copolyetherester which comprises a polytetramethylene ether terephthalate soft segment and a polybutylene terephthalate hard segment;
(B) a polymer of styrene maleic anhydride methyl methacrylate; and
(C) a grafted polymer wherein a butadiene rubber substrate is grafted with styrene and acrylonitrile monomers.

12. A polyblend according to any one of claims 1 to 10 wherein the polymer of the vinyl aromatic monomer and the unsaturated dicarboxylic acid anhydride of Component B is prepared by polymerizing the monomers in the presence of rubber component having a glass transition temperature below 0° C. to provide from 10 to 25% by weight of rubber in the polymer.

13. Molded and extruded articles prepared from a polyblend consisting essentially of:
A. from 3 to 90% by weight of a thermoplastic copolyetherester elastomer;
B. from 5 to 70% by weight of a polymer of a vinylaromatic monomer and an unsaturated dicarboxylic acid anhydride monomer and optionally a termonomer, selected from the group consisting of $C_1$ to $C_3$ acrylates and methacrylates and unsaturated nitriles, wherein the relative amounts by weight of the monomers in the polymer are 50 to 85% of the vinylaromatic monomer, 15 to 35% of the dicarboxylic acid anhydride and 0 to 20% of the termonomer; and wherein the monomers are polymerized in the presence of 0 to 25% by weight of a rubber having a glass transition temperature below 0° C.; and
C. from 5 to 70% by weight of a grafted polymer composition comprising a graft polymer of from 20 to 40 parts by weight of a monomer selected from the group consisting of methyl methacrylate and acrylonitrile and 80 to 60 parts by weight of a vinyl aromatic monomer, the polymer being grafted onto a substrate rubber having a glass transition temperature below 0° C. wherein the monomers are polymerized in the presence of and grafted onto the substrate rubber, wherein the weight percent of the rubber is in the range from 5 to 60% by weight based on the weight of the composition;
and wherein the weight percent for Components (A), (B) and (C) is based on the total amount of Components (A), (B) and (C) in the polyblend.

14. A polyblend consisting of:
A. from 3 to 90% by weight of a thermoplastic copolyetherester elastomer;
B. from 5 to 70% by weight of a polymer of a vinylaromatic monomer and an unsaturated dicarboxylic acid anhydride monomer and optionally a termonomer, selected from the group consisting of $C_1$ to $C_3$ acrylates and methacrylates and unsaturated nitriles, wherein the relative amounts by weight of the monomers in the polymer are 50 to 85% of the vinylaromatic monomer, 15 to 35% of the dicarboxylic acid anhydride and 0 to 20% of the termonomer; and C. from 5 to 70% by weight of a grafted polymer composition comprising a rubber modified polymer of a vinyl aromatic monomer, an unsaturated dicarboxylic acid anhydride and optionally a termonomer selected from the group consisting of $C_1$ to $C_3$ acrylates and methacrylates and unsaturated nitriles; wherein the monomers are polymerized in the presence of 5 to 35% by weight of a rubber having a glass transition temperature below 0° C. and wherein the weight percent for Components (A), (B) and (C) is based on the total amount of Components (A), (B) and (C) in the polyblend.

15. A polyblend as in claim 14 wherein Component C is a rubber-modified polymer of styrene, maleic anhydride and, optionally, methyl methacrylate.

* * * * *